United States Patent [19]

Miura

[11] 4,204,484
[45] May 27, 1980

[54] AUXILIARY COMBUSTION CHAMBER OF INTERNAL COMBUSTION ENGINE

[75] Inventor: Nobuhiro Miura, Susono, Japan

[73] Assignee: Toyota Jidosha Kogyo Kabushiki Kaisha, Toyota, Japan

[21] Appl. No.: 947,096

[22] Filed: Sep. 29, 1978

Related U.S. Application Data

[63] Continuation of Ser. No. 695,111, Jun. 11, 1976, abandoned.

[30] Foreign Application Priority Data

Jun. 24, 1975 [JP] Japan .................................. 50-76439
Mar. 3, 1976 [JP] Japan .................................. 51-22213

[51] Int. Cl.² .............................................. F02B 19/10
[52] U.S. Cl. .............................. 123/32 SP; 123/32 L
[58] Field of Search ........... 123/32 SP, 32 ST, 191 S, 123/191 SP, 32 D, 32 K, 32 L, 32 SA

[56] References Cited

U.S. PATENT DOCUMENTS

| | | | |
|---|---|---|---|
| 2,012,086 | 8/1935 | Mock | 123/32 ST |
| 2,184,357 | 12/1939 | Mallory | 123/32 SP |
| 2,422,610 | 6/1947 | Bagnulo | 123/32 SP |
| 2,808,036 | 10/1957 | von Seggern | 123/191 SP |

FOREIGN PATENT DOCUMENTS 986326  7/1951  France .................................. 123/32 SP

*Primary Examiner*—Ronald B. Cox
*Attorney, Agent, or Firm*—Stevens, Davis, Miller & Mosher

[57] ABSTRACT

An internal combustion engine having an auxiliary combustion chamber is disclosed. The engine comprises a main combustion chamber defined by a cylinder, a piston reciprocably disposed in the cylinder, and a cylinder head. A main passage intercommunicates the main and auxiliary combustion chambers. The auxiliary combustion chamber is divided into first and second sub-chambers. A fuel injection nozzle is disposed in the second sub-chamber so that the fuel injected therefrom is directed to a recess in the first sub-chamber. The main passage opens into a portion of the first sub-chamber which is substantially symmetrical to the recess. Electrodes of a spark plug are disposed in the recess. Also, a sub-passage, which opens into the recess, may be provided for intercommunicating the main passage and the recess.

14 Claims, 10 Drawing Figures

AUXILIARY COMBUSTION CHAMBER OF INTERNAL COMBUSTION ENGINE

This is a continuation of application Ser. No. 695,111, filed June 11, 1976, now abandoned.

This invention relates to a stratified charge internal combustion engine having an auxiliary combustion chamber wherein a fuel mixture is first combusted in the auxiliary combustion chamber, and then the flame produced therein propagates into the main combustion chamber.

A stratified charge internal combustion engine having an auxiliary combustion chamber is known. In that engine, the auxiliary chamber is provided in addition to the main combustion chamber so that an air-fuel mixture is first burned in the auxiliary combustion chamber, and the flame developed therein is then blown into the main combustion chamber to carry the combustion through the mixture contained therein, in an effort to improve the ignition efficiency of the engine and to accelerate the combustion speed of the mixture therein. This type of engine provided with an auxiliary combustion chamber is popularly used not only with diesel engines but also with spark ignition internal combustion engines. More particularly, the method of burning lean air-fuel mixtures has been adopted in order to reduce such toxic substances as hydrocarbon, carbon monoxide, and especially nitrogen oxides, that are usually present in the exhaust gases from internal combustion engines. In order to obtain higher ignition efficiency and higher combustion speed in the engines in which such lean mixtures are combusted, the auxiliary combustion chamber of the aforesaid type has been provided to accomplish the initial combustion therein. In this type of internal combustion engine, means to supply fuel, such as a fuel injection nozzle, is provided in the auxiliary chamber.

In the conventional internal combustion engine that has a fuel injection nozzle in its auxiliary combustion chamber, combustion in the auxiliary chamber takes place too abruptly, with resultant excessively rapid combustion in the main combustion chamber. As a result, the sound of explosion is louder, and the maximum combustion pressure and temperature are raised. It is apparent then that difficulties have been encountered in such engines with respect to noise of the engine and heat-resistivity of the engine material.

Therefore, the main object of this invention is to provide an auxiliary combustion chamber of an internal combustion engine wherein combustion is carried out in approximately the same way as under constant pressure, and even a very lean air-fuel mixture can be ignited by stratifying the inside of the auxiliary combustion chamber.

This invention relates to an internal combustion engine having an auxiliary combustion chamber and comprising a main combustion chamber defined by a cylinder, a piston snugly fit in the cylinder for reciprocable movement therein and a cylinder head covering the cylinder, an auxiliary combustion chamber provided in the cylinder or cylinder head, and a main passage intercommunicating the main and auxiliary combustion chambers, a narrowed-down portion projecting inward is formed in the auxiliary combustion chamber in order to divide it into a first sub-chamber in which the passage opens and a second sub-chamber at the back thereof, a fuel injection nozzle is disposed in the second sub-chamber so that the fuel injected therefrom is directed to a recess formed in the first sub-chamber by the narrowed-down projected portion, the passage opens into a portion of the first sub-chamber that is substantially symmetrically apart from the recess, and the electrodes of a spark plug are exposed in the recess. Additionally a sub-passage, which opens into the recess, may be provided for intercommunicating the main passage and the recess.

In order that this invention may be fully understood, it will now be described in detail with reference to the accompanying drawings, in which.

DETAILED DESCRIPTION OF THE PREFERRED EMBODIMENTS

Figure 1:
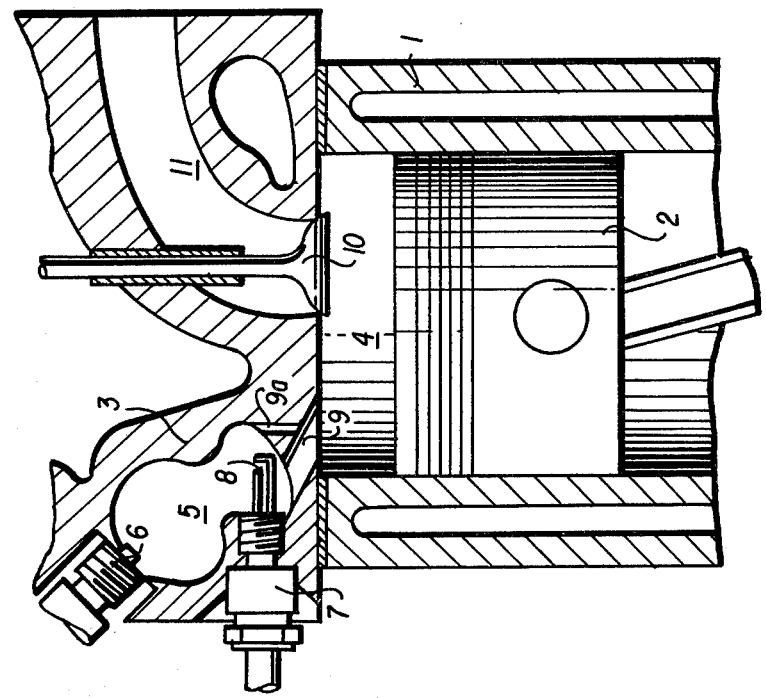
FIG. 1 is a schematic view of an internal combustion engine in which an auxiliary combustion chamber according to this invention is provided.

Referring first to FIG. 1, the overall construction of an internal combustion engine having an auxiliary combustion chamber according to this invention will be described.

This internal combustion engine comprises a cylinder 1, a piston 2 snugly fit in the cylinder 1 so as to reciprocate therein, a cylinder head 3 covering the cylinder 1, and a main combustion chamber 4 that consists of a space defined by said cylinder 1, piston 2 and cylinder head 3. In the cylinder head 3 is provided an auxiliary combustion chamber 5, in which, in turn, are exposed a fuel injection nozzle 6 and the electrodes 8 of a spark plug 7. The auxiliary combustion chamber 5 may be formed integrally in the cylinder head 3, as in the embodiment of FIG. 1, or otherwise may be provided by pressing in a separately prepared auxiliary chamber shell into a bore made in the cylinder head (for example, see FIG. 8). A passageway 9 intercommunicates the auxiliary combustion chamber 5 with the main combustion chamber 4, so that the flame developed in the auxiliary combustion chamber 5 propagates into the main combustion chamber 4. An intake valve 10 is disposed in the main combustion chamber 4 so as to regulate a lean air-fuel mixture or air alone that is to be introduced through an intake passage 11 into the main combustion chamber 4.

The operation of the above-described internal combustion engine will be described in the following paragraphs.

As the piston 2 descends on its intake stroke, the intake valve 10 opens to introduce the lean air-fuel mixture through the intake passage 11 into the main combustion chamber 4. On entering the subsequent compression stroke, the piston 2 rises to urge the lean mixture from the main combustion chamber 4 through the passage 9 into the auxiliary combustion chamber 5. While the piston 2 is still in this compression stroke, the fuel injection nozzle 6 feeds fuel into the auxiliary combustion chamber 5. As a result, the air-fuel mixture in the auxiliary combustion chamber 5 becomes so rich that it becomes possible to ignite the mixture with the spark plug 7. The flame produced by the combustion in the auxiliary combustion chamber 5 is blown into the main combustion chamber 4 through the passage 9, and the lean air-fuel mixture in the main combustion chamber 4 is combusted thereby. Then, the piston 2 is lowered again on its expansion stroke, and the output of the engine is taken out through a crank shaft not illustrated. Subsequently, the rising piston 2 enters its exhaust stroke, whereupon exhaust gases are discharged through an exhaust valve not shown, which is followed by another intake stroke. Of course, the internal combustion engine having the auxiliary combustion chamber of this invention repeats the above-described strokes.

Figure 2:
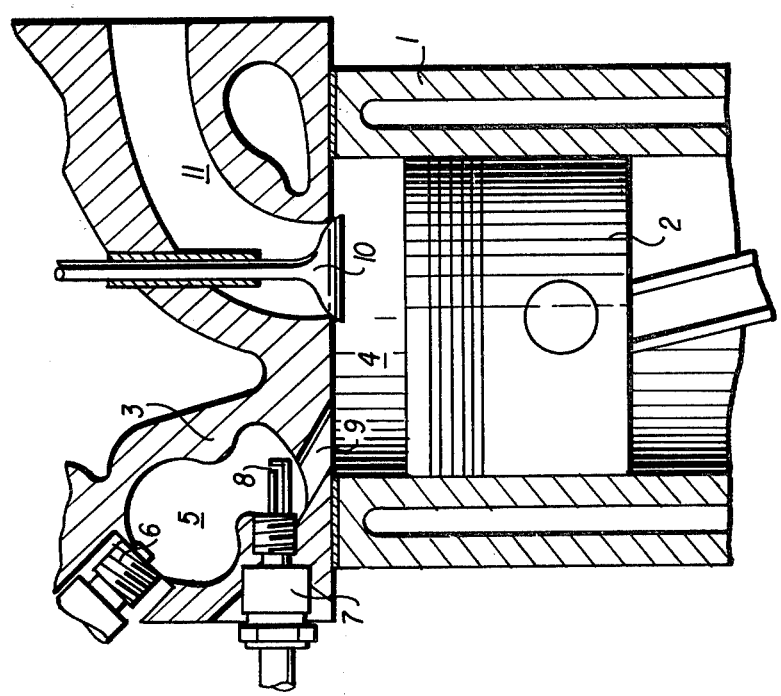
FIG. 2 is a view similar to FIG. 1 but showing an alternative embodiment of the invention.

The embodiment of FIG. 2 is similar in construction and operation to that of FIG. 1 except that in FIG. 2 a subpassage 9a intercommunicates the passage 9 and the auxiliary combustion chamber 5.

Figure 3:
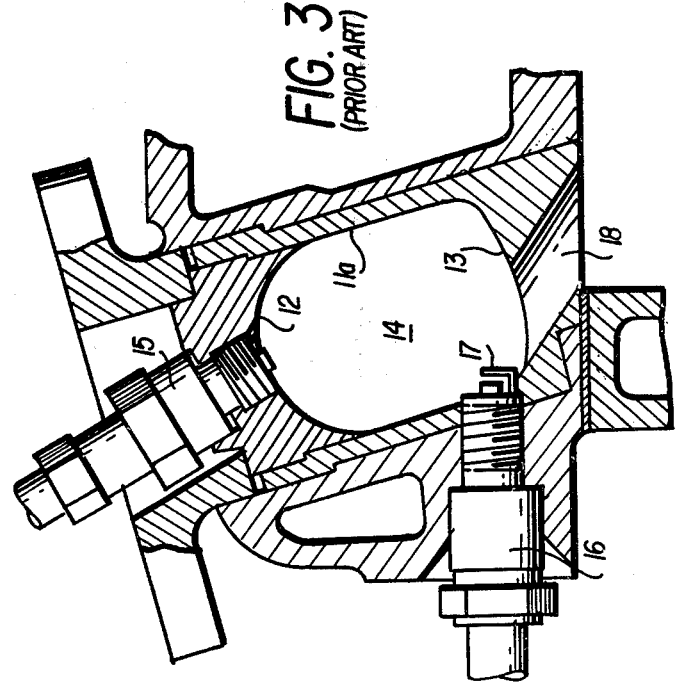
FIG. 3 is a cross-sectional view of an engine having a conventional auxiliary combustion chamber.

A known auxiliary combustion chamber 14 is shown in FIG. 3. The auxiliary combustion chamber 14 is cylindrical and both ends thereof are rounded or ellipsoidal in shape as shown in FIG. 3. The interior wall of the auxiliary combustion chamber is a substantially straight-lined cylindrical surface 11a with arched end surfaces 12 and 13. That is, the auxiliary combustion chamber 14 consists of a smooth-surfaced space that contains no obstacle in or projecting from it. A fuel injection nozzle 15 is disposed at one end 12, while the electrodes 17 of a spark plug 16 are exposed in the vicinity of a passage which opens into the other end 13.

Figure 10:
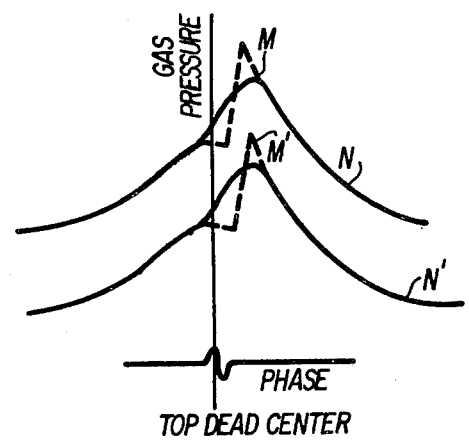
FIG. 10 is an indicator diagram showing the combustion characteristics in the internal combustion engine provided with the auxiliary combustion chamber of this invention.

In the auxiliary combustion chamber 14 of the known type which is constructed as described above, turbulance of the mixture becomes so violent that a lean air-fuel mixture may not be combusted. In addition, the combustion in the auxiliary chamber 14 and the main chamber 4 occurs too quickly as indicated by the broken lines M and M' on the indicator characteristic curves in FIG. 10. This results in greater explosion sounds which increase the noise of the engine, elevates the maximum combustion temperature, which leads to an increase in the nitrogen oxides content in its exhaust gases, and also results in various problems relating to the heat resistivity of the materials that make up the auxiliary or main combustion chambers.

It has now been found that the disadvantages inherent in the conventional auxiliary combustion chamber can be obviated according to this invention.

Another embodiment of the invention wll now be described with reference to FIGS. 4 and 5.

An auxiliary combustion chamber 31 according to this invention has a narrowed-down portion 23 enclosed with a projected portion 22, the narrowed-down portion 23 dividing the auxiliary chamber 21 into a first sub-chamber 24 and a second sub-chamber 25. In the second sub-chamber 25 is disposed a fuel injection nozzle 26 in such a manner that the fuel injected therefrom is directed to a recess 27 formed in said first sub-chamber 24. This recess 27 is formed in the first sub-chamber 24 by means of the projected portion 22 which encloses the narrowed-down portion 23. The conformation of the portion 23 may be suitably modified provided it is constructed so as to buffer the flow of the mixture in the auxiliary chamber 21 to cause the mixture to stagnate. Also in this embodiment, a passage 29 communicating with a main combustion chamber 28 (which passage corresponds to the passage 9 of FIG. 1) opens into the first sub-chamber 24 at a position symmetrical to the recess 27 about the longitudinal axis of the auxiliary combustion chamber 21. However the passage 29 may also open into the first sub-chamber 24 at other positions provided the passage opening is far enough from the recess 27 so as to not disturb the stagnant mixture in the recess 27. The electrode 31 of a spark plug 30 is exposed in the recess 27. The auxiliary combustion chamber 21 is defined in an auxiliary combustion chamber shell 32 which is pressed into a bore 34 in a cylinder head 33. Alternatively, the auxiliary combustion chamber 21 may be formed integrally in the cylinder head 33. The transverse cross-section of the auxiliary combustion chamber 21 is not limited to a circular shape as shown in FIGS. 4 and 5, but may be of other suitable shapes and constructions. Further, the projected portion 22 that surrounds the narrowed-down portion 23, which is formed along the entirety of the interior wall 35 in this embodiment, may be divided on some parts thereof.

In order to obtain good combustion in the auxiliary combustion chamber 21, it is desirable to apply the following optimum ratios:

$$(V_3+V_4)/(V_1+V_2+V_3+V_4)=0.50 \text{ to } 0.90 \quad (I)$$

$$V_4/V_3=0.3 \text{ to } 1 \quad (II)$$

$$a/b=0.5 \text{ to } 0.8 \quad (III)$$

wherein, $V_1$ is the volume of the main combustion chamber when the piston reaches top dead center, $V_2$ is the volume of the passage 29, $V_3$ designates the volume of the first sub-chamber 24, $V_4$ designates the volume of the second sub-chamber 25, "a" designates the minimum inner diameter of the narrowed-down portion 23 and "b" designates the maximum inner diameter of the second sub-chamber 25. More specifically, in formula (I) above, the optimum ratio is 0.85. In formula (II) above, the optimum ratio is 0.5. In formula (III) above, the optimum ratio is 0.65.

The embodiment of the invention just described operates as described hereunder.

On entering the compression stroke, the lean air-fuel mixture in the main combustion chamber 28 is urged through the passage 29 into the auxiliary combustion chamber 21. The lean mixture thus supplied flows, while being contracted, from the first sub-chamber 24 to the narrowed-down portion 23, and thence to the second sub-chamber 25. At a certain time during this compression stroke, fuel is injected from the fuel injection nozzle 26 toward the recess 27. Then part of the fuel is injected is carried back to the second sub-chamber 25 by the stream of the mixture flowing from the first sub-chamber 24 to the second sub-chamber 25. Since the mixture in the recess 27 is stagnant, part of the fuel injected also is held therein to make the air-fuel mixture in the recess 27 richer than that elsewhere in the auxiliary combustion chamber 21. On being ignited by the electrode 31 of the spark plug 30, the rich mixture in the recess 27 readily ignites. Then, part of the flame is blown into the main combustion chamber 28 through the passage 29, while the greater part of the flame is compressedly delivered through the narrowed-down portion 23 to the second sub-chamber 25. Although the air-fuel mixture in the second sub-chamber 25 is relatively lean, the flame securely and steadily propagates therethrough, as the mixture therein is stirred by the contracted flow passing through the narrowed-down portion 23. This results in combustion comparable to that under constant pressure and does not occur too rapidly, as indicated by the characteristic curve N of FIG. 10. Further, the combustion in the main combustion chamber 28 resembles the combustion in the auxiliary chamber 21 and again approximates combustion under constant pressure, as indicated by the characteristic curve N' in FIG. 10.

In the above, it is desirable to set the fuel-air ratio in the recess 27 as near an ignitable limit value as possible and as lean as possible. By setting the values with respect to $V_1$, $V_2$, $V_3$, $V_4$, a and b as applied in formulas (I), (II) and (III), the optimum limit value can be obtained. Thereby, the air-fuel ratio within the engine can be set to an optimum one as a whole and a further reduction of $NO_x$ from the engine can be expected. Further, by the limitation as applied in formula (I) above, the amount of combustion within the auxiliary combustion chamber can be increased. Thereby, the mean effective pressure of the engine can be increased and loss of output can be prevented.

As explained hereabove, the air-fuel mixture in the auxiliary combustion chamber of this invention is stratified, so that the mixture therein may be ignited even when it becomes lean and the production of nitrogen oxides due to the combustion in the auxiliary chamber may be decreased. In addition, since the combustion therein approaches that under constant pressure, this invention is conductive to the prevention of excessive noises, and offers valuable advantages with respect to the heat-resistivity of materials.

In the above description, a lean air-fuel mixture is introduced into the main combustion chamber 28. But the same end and effect may be accomplished even if air alone is introduced therein.

Figure 6:
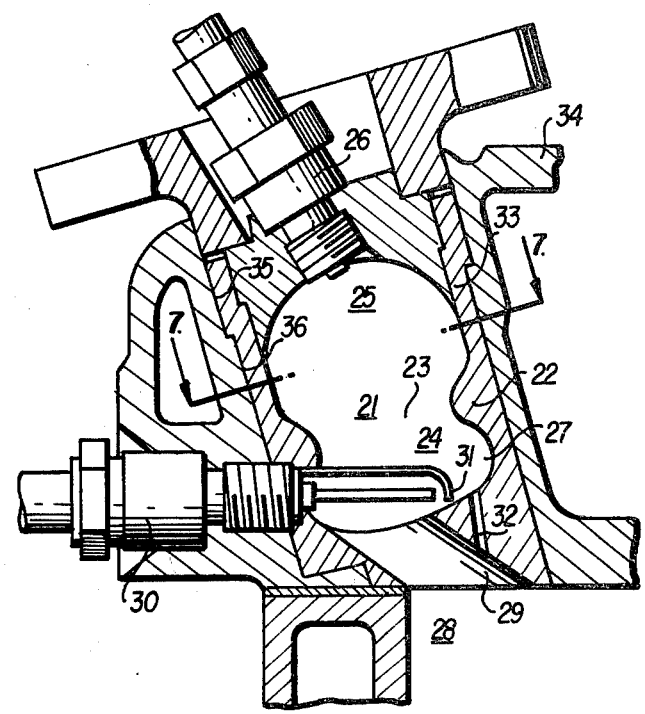
FIG. 6 is a view similar to FIG. 4 but showing an alternative embodiment of the invention.
Figure 7:
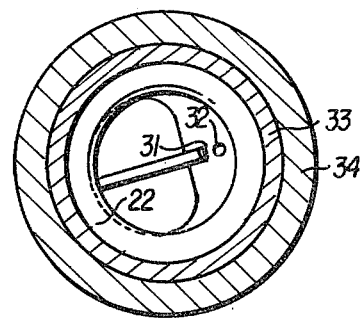
FIG. 7 is a cross-section taken along the line 7—7 of FIG. 6.

Another embodiment of the invention will now be described with reference to FIGS. 6 and 7. A detailed description of the construction of this embodiment will be omitted because it is similar to the embodiments of FIGS. 4 and 5. In the embodiment of FIGS. 6 and 7, the passage 29 is a main passage which communicates with the main combustion chamber 28 and opens into the first sub-chamber 24 at a position symmetrical to the recess 27 about the longitudinal axis of the auxiliary combustion chamber 21. Also in this embodiment, a sub-passage 32, which intercommunicates the main passage 29 and the first sub-chamber 24, is provided in order to vaporize fuel adhering to the interior wall of the recess 27 to an extent which does not excessively decrease the air-fuel ratio. As in the embodiment of FIGS. 4 and 5, in order to obtain good combustion in the auxiliary combustion chamber in the embodiment of FIGS. 6 and 7, it is desirable to apply to optimum ratio values discussed above with respect to FIGS. 4 and 5.

The embodiment of FIGS. 6 and 7 operates as follows. On entering the compression stroke, the lean air-fuel mixture in the main combustion chamber 28 is urged through the main passage 29 and the sub-passage 32 into the auxiliary combustion chamber 21. The lean mixture thus supplied flows, while being contracted, from the first sub-chamber 24 to the narrowed-down portion 23, and thence to the second sub-chamber 25. At a certain time during this compression stroke, fuel is injected from the fuel injection nozzle 26 toward the recess 27. Then part of the fuel injected is carried back to the second sub-chamber 25 by the stream of the mixture flowing from the first sub-chamber 24 to the second sub-chamber 25. There exists a rich air-fuel mixture in the recess 27 since part of the fuel injected toward the recess 27 is vaporized in the recess 27 by the stream of the mixture flowing from the sub-passage 32 and the fuel adhering to the interior wall of the recess 27 is also vaporized by the stream of the mixture introduced from the sub-passage 32. On being ignited by the electrodes 31 of the spark plug 30, the rich mixture in the recess 27 readily ignites. Then, part of the flame is blown into the main combustion chamber 28 either through the sub-passage 32 and main passage 29 or through main passage 29 while the greater part of the flame is compressedly delivered through the narrowed-down portion 23 to the second sub-chamber 25. Although the air-fuel mixture in the second sub-chamber 25 is relatively lean, the flame securely and steadily propagates therethrough, as the mixture therein is stirred by the contracted flow passing through the narrowed-down portion 23. This results in combustion comparable to that under constant pressure and does not occur too rapidly, as indicated by the characteristic curve N of FIG. 10. Further, the combustion in the main combustion chamber 28 resembles the combustion in the auxiliary chamber 21 and again approximates combustion under constant pressure, as indicated by the characteristic curve N' in FIG. 10.

Figure 9:
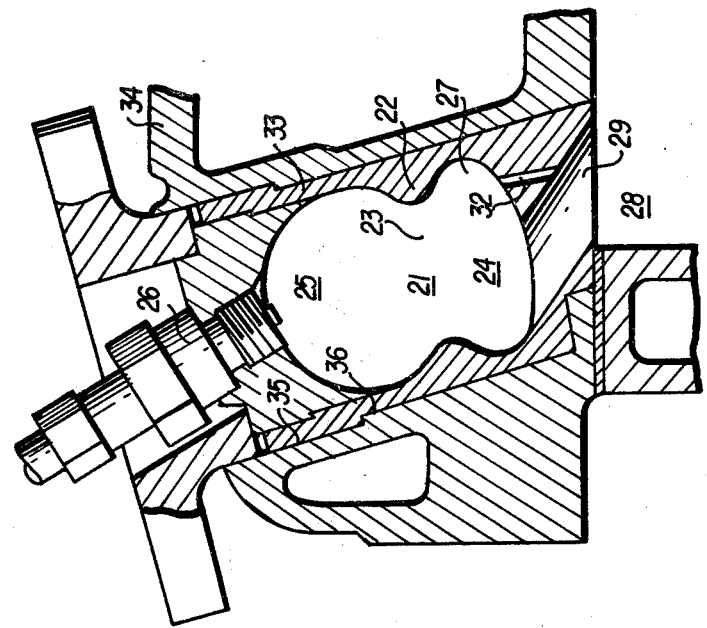
FIG. 9 is a view similar to FIG. 8 but showing another embodiment of the invention.
Figure 8:
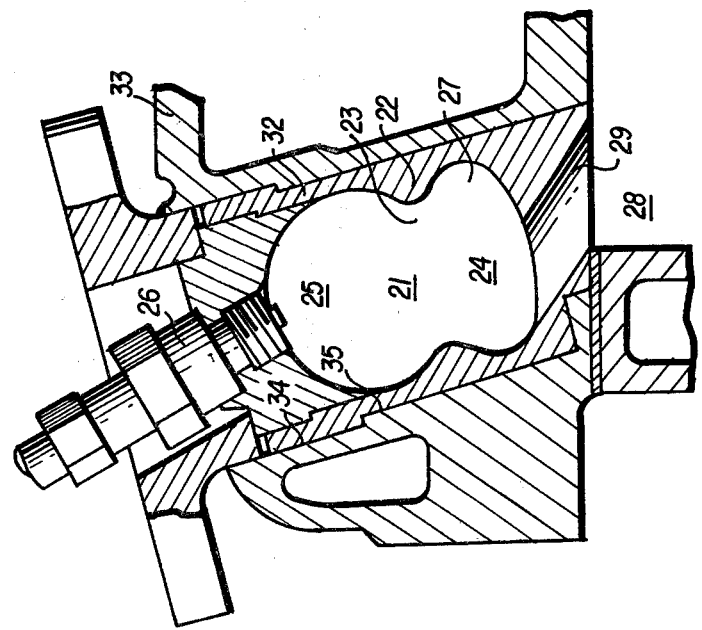
FIG. 8 is a cross-sectional view of another embodiment of this invention.

Referring next to FIGS. 8 and 9, this invention as applied to a self-ignition or diesel engine will be described.

Figure 4:
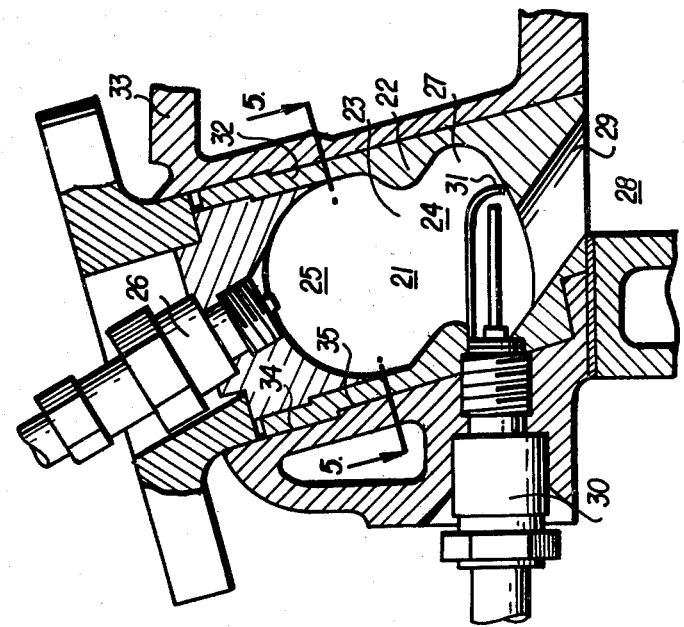
FIG. 4 is a cross-sectional view of an embodiment of this invention.
Figure 5:
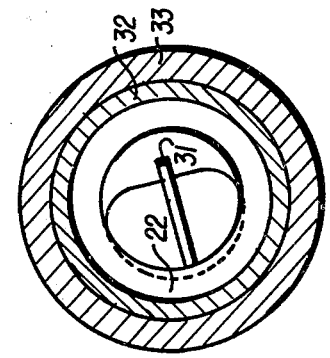
FIG. 5 is a cross-section taken along the line 5—5 of FIG. 3.

Description of the construction of the FIG. 8 embodiment will be omitted, because it is similar to that illustrated in FIGS. 4 and 5, except that the spark plug 30 and its electrode 31 are eliminated.

The following paragraphs describe the operational phase of the FIG. 8 embodiment.

At some time during the compression stroke, fuel is injected from the fuel injection nozzle 26 toward the recess 27. Part of this fuel is carried to the second sub-chamber 25 by the stream of air urged through the passage 29 to the auxiliary combustion chamber 21, while the remainder stagnates in the recess 27. As the piston approaches top dead center during the compression stroke, the mixture is first ignited and combusted in the recess 27, and the flame produced by this initial combustion propagates into the main combustion chamber 28 through the intercommunicating passage 29 on one hand, and is employed for burning the mixture in the second sub-chamber 25 on the other. Because the subsequent steps are substantially similar to those of the embodiment illustrated in FIGS. 4 and 5, those steps will not be described.

Another embodiment of the invention will now be described with reference to FIG. 9. A detailed description of the construction of this embodiment will be omitted because it is similar to the embodiment of FIG. 8. In FIG. 9, the passage 29 is a main passage which communicates with the main combustion chamber 28 and opens into the first sub-chamber 24 at a position symmetrical to the recess 27 about the longitudinal axis of the auxiliary combustion chamber 21. In the FIG. 9 embodiment, a sub-passage 32, which intercommunicates the main passage 29 and the first sub-chamber 24, is provided in order to vaporize fuel adhering to the interior wall of the recess 27 to an extent which does not excessively decrease the air-fuel ratio.

The following paragraphs describe the opertional phase of this embodiment.

At some time during the compression stroke, fuel is injected from the fuel injection nozzle 26 toward the recess 27. Part of this fuel is carried to the second sub-chamber 25 by the stream of air urged through the passage 29 to the auxiliary combustion chamber 21, part of the fuel injected toward the recess 27 is vaporized in the recess 27 by the stream of the mixture flowing from the sub-passage 32 and part of the fuel adhering to the interior wall of the recess 27 is also vaporized by the stream of the mixture flowing from the sub-passage 32 and the recess 27 is filled with a rich air-fuel mixture. As the piston approaches top dead center during the compression stroke, the mixture is first ignited and combusted in the recess 27, and the flame produced by this initial combustion propagates into the main combustion chamber 28 either through the sub-passage 32 and main passage 29 or through main passage 29 on one hand, and is employed for burning the mixture in the second sub-chamber 25 on the other. Because the subsequent steps are substantially similar to those of the embodiment illustrated in FIGS. 6 and 7, they will not be described here.

With diesel engines of the types of FIGS. 8 and 9, not only the noise resulting from the combustion of the air-fuel mixture but also the amount of nitrogen oxides in the exhaust gases can be decreased. In addition, the amount of black smoke inherently produced in the auxiliary combustion chamber of diesel engines can be reduced.

As will be evident from the above description, this invention makes it possible to burn a lean air-fuel mixture in the auxiliary combustion chamber, reduce the amount of nitrogen oxides emitted with the exhaust gases, and decrease the engine noise.

What is claimed is:

1. An internal combustion engine comprising:
   a cylinder;
   a piston reciprocably disposed in said cylinder;
   a cylinder head covering said cylinder;
   a main combustion chamber defined by said cylinder, said piston, and said cylinder head;
   means defining an auxiliary combustion chamber;
   a passage directly intercommunicating said main combustion chamber and said auxiliary combustion chamber;
   said means comprising a projection, intermediate the end thereof, projecting inwardly, extending continuously around substantially the entire periphery thereof dividing said auxiliary combustion chamber into a first sub-chamber adjacent one end thereof and a second sub-chamber adjacent the other end thereof, and defining a recess in said first sub-chamber beneath said projection;
   a spark plug having electrodes positioned in said recess;
   a fuel injection nozzle situated in said second sub-chamber so that fuel injected therefrom is directed in a direction directly toward said recess; and
   said passage opens into a portion of said first sub-chamber spaced from said recess.

2. An internal combustion engine as claimed in claim 1, wherein:
   the auxiliary combustion chamber is circular in transverse cross-section.

3. An internal combustion engine as claimed in claim 2, wherein:

$$(V_3+V_4)/(V_1+V_2+V_3+V_4)=0.50 \text{ to } 0.90$$

$$V_4/V_3=0.3 \text{ to } 1$$

$$a/b=0.5 \text{ to } 0.8$$

and $V_1$ is the volume of the main combustion chamber when the piston is at top dead center;
   $V_2$ is the volume of the passage;
   $V_3$ is the volume of the first sub-chamber;
   $V_4$ is the volume of the second sub-chamber;
   a is the inner diameter of the projecting portion; and
   b is the inner diameter of the second sub-chamber.

4. An internal combustion engine as claimed in claim 1, further comprising:
   a sub-passage intercommunicating said passage and said first sub-chamber; and
   said sub-passage opens into said recess.

5. An internal combustion engine as claimed in claim 4, wherein:
   the auxiliary combustion chamber is circular in transverse cross-section.

6. An internal combustion engine as claimed in claim 5, wherein:

$$(V_3+V_4)/(V_1+V_2+V_3+V_4)=0.50 \text{ to } 0.90$$

$$V_4/V_3=0.3 \text{ to } 1$$

$$a/b=0.5 \text{ to } 0.8$$

and $V_1$ is the volume of the main combustion chamber when the piston is at top dead center;
   $V_2$ is the volume of the passage;
   $V_3$ is the volume of the first sub-chamber;
   $V_4$ is the volume of the second sub-chamber;
   a is the inner diameter of the projecting portion; and
   b is the inner diameter of the second sub-chamber.

7. An internal combustion engine as claimed in claim 1, wherein:
   said auxiliary combustion chamber is defined in said cylinder head.

8. An internal combustion engine comprising:
   a cylinder;
   a piston reciprocably disposed in said cylinder;
   a cylinder head covering said cylinder;
   a main combustion chamber defined by said cylinder, said piston, and said cylinder head;
   means defining an auxiliary combustion chamber;
   a passage directly intercommunicating said main combustion chamber and said auxiliary combustion chamber, one end of said passage opening directly into said main combustion chamber and the other end thereof opening directly into said auxiliary combustion chamber;
   said means comprising a projection, intermediate the ends thereof, projecting inwardly, extending continuously around substantially the entire periphery thereof, dividing said auxiliary combustion chamber into a first sub-chamber adjacent one end thereof and a second sub-chamber adjacent the other end thereof, and defining a recess thereadjacent in said first subchamber beneath said projection;

a spark plug having electrodes positioned in said recess;

a fuel injection nozzle situated in said second sub-chamber and directed toward said recess so that fuel injected therefrom is directed in a direction directly toward said recess; and said passage opens directly into a portion of said first sub-chamber spaced from said recess.

9. An internal combustion engine as defined in claim 8, further comprising:
a sub-passage intercommunicating said passage and said first sub-chamber; and
one end of said sub-passage opens directly into said passage and the other end thereof opens directly into said recess.

10. An internal combustion engine comprising:
a cylinder;
a piston reciprocably disposed in said cylinder;
a cylinder head covering said cylinder;
a main combustion chamber defined by said cylinder, said piston, and said cylinder head;
means defining an auxiliary combustion chamber circular in transverse cross-section;
a substantially straight passage intercommunicating said main combustion chamber and said auxiliary combustion chamber, one end of said passage opening directly into said main combustion chamber and the other end thereof opening directly into said auxiliary combustion chamber;
said means comprising an annular portion, intermediate the ends thereof, projecting radially inwardly, dividing said auxiliary combustion chamber into a first sub-chamber adjacent one end thereof and a second sub-chamber adjacent the other end thereof, and defining a recess in said first sub-chamber between said annular portion and one end of said auxiliary combustion chamber and beneath said annular portion;
a spark plug having electrodes positioned in said recess;
a fuel injection nozzle situated in said second sub-chamber adjacent the end thereof more remote from said first subchamber, said nozzle being directed toward said recess so that fuel injected therefrom is directed in a direction directly toward said recess;
said passage opens directly into a portion of said first sub-chamber spaced from said recess; and $(V_3+V_4)/(V_1+V_2+V_3+V_4)=0.50$ to $0.90$ $V_4/V_3=0.3$ to $1$ $a/b=0.5$ to $0.8$ where $V_1$ is the volume of the main combustion chamber when the piston is at top dead center,
$V_2$ is the volume of the passage,
$V_3$ is the volume of the first sub-chamber,
$V_4$ is the volume of the second sub-chamber,
a is the inner diameter of the annular portion; and
b is the inner diameter of the second sub-chamber.

11. An internal combustion engine as claimed in claim 10, further comprising:
a sub-passage intercommunicating said passage and said first sub-chamber, and
one end of said sub-passage opens directly into said passage and the other end thereof opens directly into said recess.

12. An internal combustion engine as claimed in claim 1 wherein:
the central axis of the passage extends from the first sub-chamber toward the central axis of the cylinder.

13. An internal combustion engine as claimed in claim 8, wherein:
the central axis of the passage extends from the first sub-chamber toward the central axis of the cylinder.

14. An internal combustion engine as claimed in claim 10, wherein:
the central axis of the passage extends from the first sub-chamber toward the central axis of the cylinder.

* * * * *